United States Patent [19]

Wiegel et al.

[11] Patent Number: 4,633,186

[45] Date of Patent: Dec. 30, 1986

[54] DIGITAL SIGNAL PATTERN RECOGNITION CIRCUIT

[75] Inventors: Manfred Wiegel, Stuttgart; Harald Dorr, Ludwigsburg, both of Fed. Rep. of Germany

[73] Assignee: International Standard Electric Corporation, New York, N.Y.

[21] Appl. No.: 688,789

[22] Filed: Jan. 4, 1985

[30] Foreign Application Priority Data

Jan. 11, 1984 [DE] Fed. Rep. of Germany ....... 3400691

[51] Int. Cl.⁴ ...................... H03K 25/02; H03M 5/10
[52] U.S. Cl. .................................... 328/119; 377/95; 307/518
[58] Field of Search ............................ 377/94, 95, 96; 328/119; 307/518

[56] References Cited

U.S. PATENT DOCUMENTS

| | | | |
|---|---|---|---|
| 2,956,232 | 10/1960 | Durbin | 377/96 |
| 3,819,955 | 6/1974 | Hilbert | 377/95 |
| 4,126,795 | 11/1978 | Moorey | 377/95 |
| 4,200,812 | 4/1980 | Fichter | 377/95 |

*Primary Examiner*—John S. Heyman
*Attorney, Agent, or Firm*—John T. O'Halloran; Thomas F. Meagher

[57] ABSTRACT

To permit address-free fault location on digital communication paths with several intermediate repeaters, one or more identification signals must be recognized in the intermediate repeaters with sufficient certainty. The identification signals are digital signals with periodically recurring sections which are marked with a string of successive like bits (e.g., 0 bits) and have different durations for a first identification signal and a second identification signal.

The circuit contains a time discriminator (1) which responds when a string of successively received like bits is characteristic of a section of an identification signal. It then provides a pulse equal in length to this section to a frequency discriminator (2) which responds when such pulses recur at a frequency characteristic of an identification signal. The frequency discriminator thus delivers an output voltage whose amplitude is typical of one identification signal or the other because of the different pulse durations. By comparing this voltage with reference voltages, a following comparator (3) derives control signals indicating the reception of the respective identification signal.

5 Claims, 3 Drawing Figures

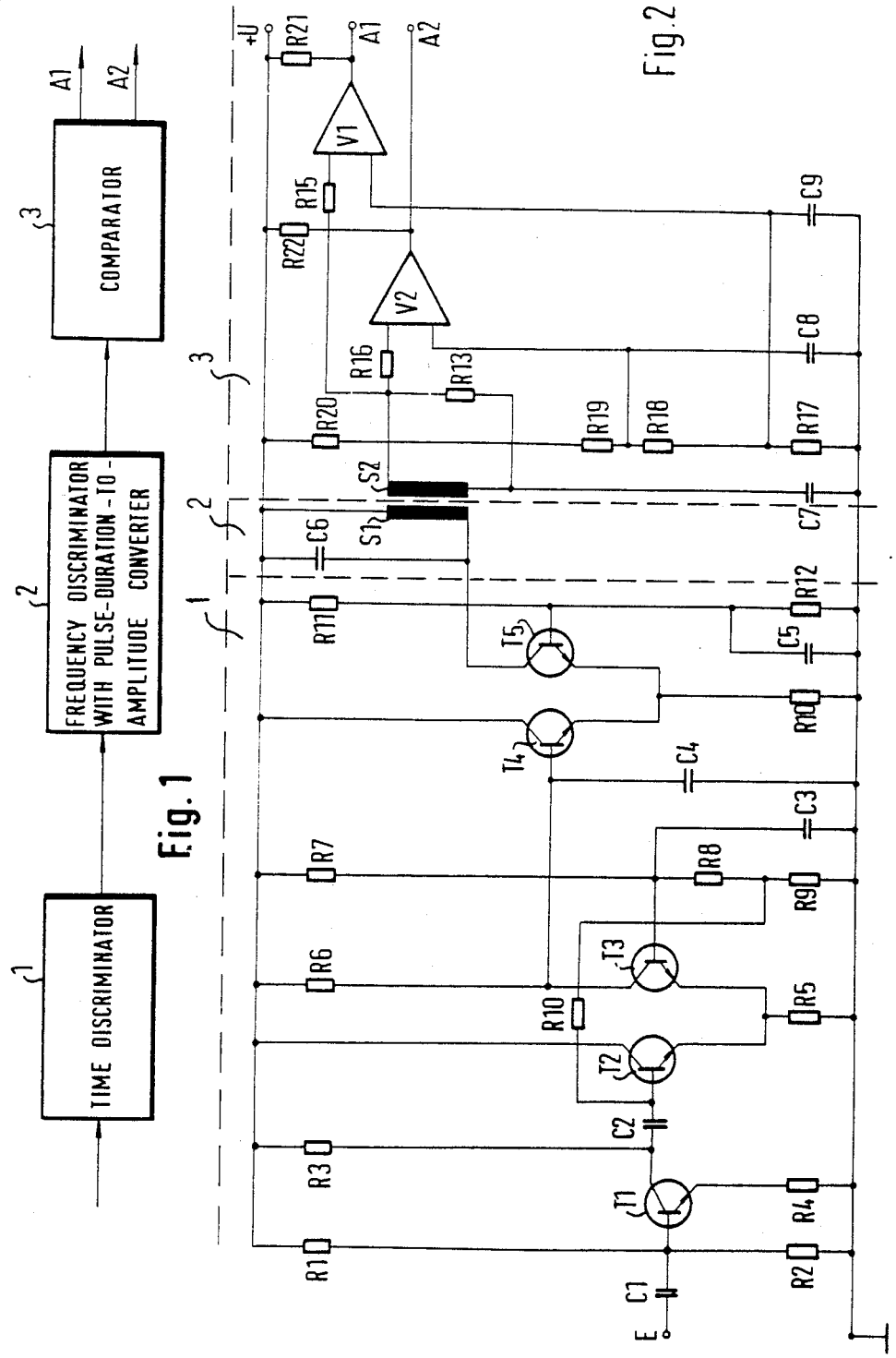

DIGITAL SIGNAL PATTERN RECOGNITION CIRCUIT

The present invention relates to a circuit arrangement as set forth in the preamble of claim 1.

A circuit arrangement of this kind is disclosed in DE-AS No. 28 42 667. Such circuits are contained in intermediate repeaters of digital communication systems using an address-free fault-locating technique. It serves to recognize with sufficient certainty a fault-locating signal transmitted from the terminal station to all intermediate repeaters, and to generate a control signal which indicates the recognition and initiates specified switching actions in the intermediate repeater for fault-locating purposes.

The prior art circuit is designed for an identification signal in which sections containing an increased number of 1 bits or 0 bits recur periodically.

The received digital signal which must be checked as to whether it contains an identification signal is rectified and fed to a resonant circuit tuned to the periodicity of the sections of the identification signal. The resonant circuit provides a defined output voltage if the digital input signal shows this periodicity, so it acts as a frequency discriminator for the input signal.

The resonant circuit must meet considerable quality and stability requirements, because the identification signal is to be recognized solely on the basis of the frequency tuning of the resonant circuit.

"telecom report" 4, (1983), No. 1, pp. 37 to 42, describes a digital communication system in which the identification signal contains periodically recurring sections like in the system referred to above, but the bit pattern is a given number of like bits, namely a string of nine 0 bits. A circuit for recognizing such identification signals is not shown there.

It is the object of the present invention to provide a circuit arrangement for recognizing such an identification signal which is based on the first-mentioned arrangement but permits the identification signal to be recognized with a high degree of certainty while the cost and complexity of the resonant circuit are comparatively low.

This object is attained as set forth in claim 1. Further advantageous aspects of the invention are claimed in the subclaims.

An essential advantage of the circuit arrangement according to the invention lies in the fact that it meets the stringent requirements for low-power consumption as are imposed because of the remote supply. The power consumption of conventional digital circuits for comparing the received digital signal with the predetermined bit pattern would be too high.

The improvement according to claim 2 has the advantage that, in addition to the detection of the presence of an identification signal, discrimination between different identification signals differing by the duration of the periodically recurring sections is possible.

In the improvement according to claim 3, if the pulses recur at the predetermined intervals, they are converted by the frequency discriminator into a voltage proportional to the pulse width, so that the various identification signals can be distinguished from each other simply by comparing the output voltage with reference voltages.

The invention will now be explained in more detail, by way of example, with reference to the accompanying drawings, in which:

FIG. 1 is a block diagram of the circuit arrangement in accordance with the invention, and FIG. 2 is a schematic circuit diagram of an embodiment of the invention.

Figure 3:
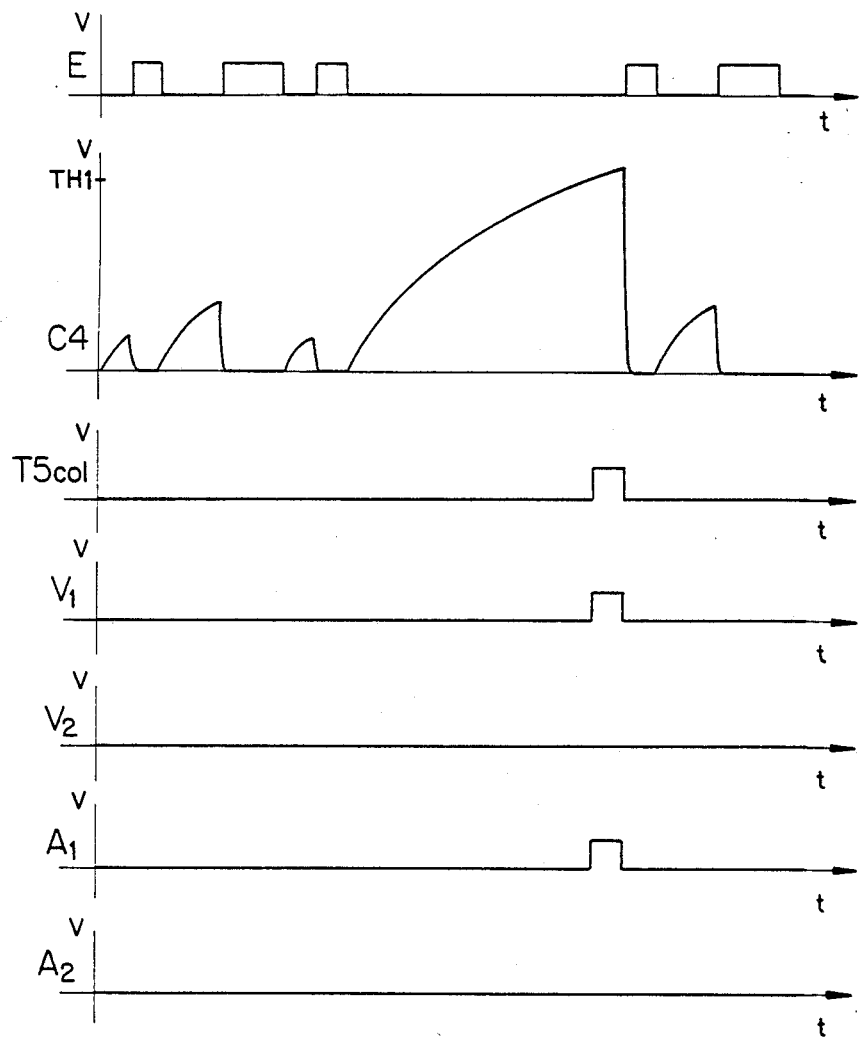
FIG. 3 shows waveforms developed at circuit junctures during operation of the invention.

The circuit described in the following is capable not only of detecting and recognizing one identification signal but of detecting and discriminating between two or more identification signals.

Each of the identification signals is a scrambled digital signal with periodically recurring sections which are marked by a string of successive like bits, and whose duration is characteristic of the identification signal. The identification signals have a bit frequency of 34 Mb/s, and the repetition frequency of the periodically recurring sections is 22.5 kHz.

A first identification signal contains nine successive 0 bits in the periodically recurring sections, and a second identification signal contains in the periodically recurring sections such a number of 0 bits that the sections have a duration of 3 to 10 $\mu$s, i.e., about 102 to 340 0 bits at the above bit frequency.

In the block diagram of FIG. 1, the digital input signal to be checked for the presence of an identification signal is applied to the input of a time discriminator 1. This time discriminator responds to any series of successive 0 bits which is long enough to be characteristic of a section of an identification signal. Since no strings of more than five 0 bits occur in the normal input signal because of the scrambling, and since the sections of the first identification signal are marked with nine successive 0 bits, the time discriminator is set so as to provide an output pulse to a following frequency discriminator 2 if eight successive 0 bits were received.

The frequency discriminator 2, essentially a parallel resonant circuit, responds to such input pulses if they recur at the regular intervals preset for identification signals. In that case, its output voltage rises steeply and exceeds the threshold of a following comparator 3, which then delivers a control signal indicating the successful recognition of the identification signal.

The invention as described thus far represents an improvement over the prior art in that the identification signal is recognized not only by the periodicity of some kind of sections, but that the time discriminator first determines whether any sections characteristic of sections of an identification signal are present at all. In other words: The time discriminator causes a preselection, so that the selectivity of the frequency discriminator need not meet such exacting requirements.

According to a preferred embodiment of the invention, the time discriminator not only senses whether a section characteristic of an identification signal is present in the received signal but also determines whether a section recognized as such is characteristic of the first or second identification signal. To do this, it terminates its output pulse, which begins when eight successive 0 bits were received, upon receipt of the last 0 bit of this string.

Thus, in the case of a section characteristic of the first identification signal, an output pulse of the time discriminator 1 has a duration of 3 to 10 $\mu$s minus the duration of 7 bits.

The information on which of the identification signals a pulse provided by the time discriminator to the frequency divider points to is thus contained in the pulse duration.

Since the output voltage of the frequency discriminator caused by long pulses of a predetermined repetition rate (22.5 kHz) is greater than that caused by pulses of shorter duration, the frequency discriminator performs a pulse duration-amplitude conversion, so that information on the kind of the detected identification signal is now contained in the amplitude of the output voltage of the frequency discriminator.

The comparator 3 compares the amplitude of the output voltage with predetermined reference voltages. In the case of the first identification signal (lower output voltage), it delivers a control signal at its output A1; in the case of the second identification signal (higher output voltage), it delivers a control signal both at the output A1 and at an additional output A2.

An embodiment of the invention described so far is shown in FIG. 2 in the form of a schematic circuit diagram.

The digital input signal is applied between the input E and ground. This input E is connected to the base of a transistor T1 through a coupling capacitor C1 for suppressing DC components of the input signal. The base of the transistor T1 is biased by a voltage divider consisting of resistors R1 and R2 between the positive terminal +U of a supply-voltage source and ground.

The collector of the transistor T1 is connected to the positive terminal +U of the supply-voltage source through a collector resistor R3, while the emitter of this transistor is grounded through an emitter resistor R4. This transistor circuit, whose output voltage is the collector voltage, acts as an inverter stage for the input signal. When the binary input signal coupled through the coupling capacitor C1 to the base of the transistor T1 is at logic 0, i.e., at a low voltage level, the transistor T1 turns off and, thus, has a high collector output voltage. When the input signal changes to logic 1, i.e., to a higher voltage level, the transistor T1 turns on and, thus, has a lower collector output voltage.

This collector output voltage is coupled through a coupling capacitor C2 to the base of a transistor T2, which shares a grounded emitter resistor R5 with another transistor T3. The collector of the transistor T2 is connected directly to the positive terminal +U of the supply-voltage source, and the collector of the transistor T3 is connected to this terminal through a collector resistor R6. The base bias for the transistor T3 is provided by a voltage divider consisting of three resistors R7, R8, and R9 between the positive terminal +U of the supply-voltage source and ground. The junction of the resistors R8 and R9 is connected via a resistor R10 to the base of the transistor T2 for adjusting the operating point of the latter, and the base of the transistor T3 is grounded through a coupling capacitor C3 to provide a path for alternating current. A charging capacitor C4 is connected between the collector of the transistor T3 and ground.

This subcircuit works as follows: When the binary signal at the input E changes to the low voltage level (logic 0), the voltage at the base of the transistor T2 rises, so that the latter turns on. This increases the emitter voltage of this transistor T2 with respect to ground and, because of the common emitter resistor, the emitter voltage of the transistor T3 with respect to ground. The base-emitter voltage of the transistor T3 thus decreases, whereby the latter is cut off. In this state, i.e., when the input E is at logic 0, the charging capacitor C4 is charged through the collector resistor R6 of the transistor T3. This charging process is terminated as soon as the logic state at the input E changes from 0 to 1, which results in a reversal of the voltage states described and causes the transistor T3 to conduct, so that the charging capacitor is discharged through this transistor T3.

However, as long as the input E is at logic 0, the charging of the charging capacitor C4 is going on. A threshold circuit compares the charging voltage of the capacitor C4 with a threshold voltage. The charging time constant (product of the value of the resistor R6 and the capacitance of the charging capacitor C4) and the threshold voltage are chosen so that the threshold voltage is exceeded after eight successively received 0 bits.

The threshold circuit consists of two transistors T4 and T5 having their emitters grounded through a common emitter resistor R10. The base voltage of the transistor T4 is the charging voltage of the charging capacitor C4 with respect to ground, and the base bias for the other transistor T5, i.e., the threshold voltage of the threshold circuit, is provided by a voltage divider consisting of two resistors R11 and R12 connected in series between the positive terminal +U of the supply-voltage source and ground. The base of the transistor T5 is grounded through a coupling capacitor C5 to provide a path for alternating current. The collector of the transistor T4 is connected directly to the positive terminal +U of the supply-voltage source, and the collector of the transistor T5 is connected to this terminal through a coil S1. The latter and a parallel capacitor C6 form a parallel resonant circuit whose resonance frequency is tuned to the predetermined repetition frequency of the periodically recurring sections of the identification signal.

With regard to the block diagram of FIG. 1, the parallel resonant circuit performs the function of the frequency discriminator, and the preceding subcircuit that of the time discriminator.

The threshold circuit in the time discriminator works as follows: As long as the charging voltage of the charging capacitor, i.e., the base voltage of the transistor T4, is lower than the base voltage of the transistor T5, the transistor T4 is off, and the transistor T5 is traversed by current supplied through the coil S1 from the supply-voltage source. As soon as the former of these voltages exceeds the latter, i.e., as soon as eight 0 bits were received in succession, the transistor T4 turns on, and the current flowing through the transistor T5 and, thus, through the coil S1 is blocked. The current through the coil S1 and the transistor T5 does not begin to flow again until the high voltage across the charging capacitor disappears, which will be the case at the end of the received string of 0 bits, as described above.

If such interruptions occur at a repetition rate equal to the resonance frequency of the resonant circuit, they will set the resonant circuit oscillating and, thus, are equal in effect to current pulses of the same duration which occur at the same repetition rate.

Thus, whenever a string of 0 bits was received which is characteristic of a section of an identification signal because of its length (because it consists of at least eight 0 bits), the time discriminator supplies to the frequency discriminator a current pulse whose duration is equal to the length of the received string of 0 bits. A shorter pulse duration is characteristic of sections of the first identification signal, and a longer pulse duration is characteristic of sections of the second identification signal.

Since current pulses of different duration, provided they occur at a repetition frequency equal to the resonance frequency, cause different amplitudes of the oscillation started by them in the resonant circuit, the two identification signals are distinguishable from each other by the amplitudes of the oscillations started in the resonant circuit.

For amplitude discrimination, the resonant circuit is inductively coupled to a comparator. The inductive coupling is accomplished by means of a coil S2, which forms a transformer together with the resonant-circuit coil S1, and whose terminals are interconnected via a load resistor R13. One of the terminals of the coil S2 is grounded through a coupling capacitor C7 to provide a path for alternating current, and the other is connected to one input of a comparator V1 via a resistor R15 and to one input of a comparator V2 via a resistor R16. The other inputs of the two comparators are connected to reference voltages obtained from a voltage divider, the comparator V1 being presented with a lower reference voltage, and the comparator V2 with a higher reference voltage. The reference voltages are delivered by a voltage divider consisting of a series arrangement of resistors R17, R18, R19, and R20 between the positive terminal +U of the supply-voltage source and ground. The two comparator inputs to which reference voltages are applied are grounded to coupling capacitors C9 and C8, respectively. The outputs of the operational amplifiers are connected to the positive terminal +U of the supply-voltage source through resistors R21 and R22, respectively, so that in the state in which the input voltage is lower than the reference voltage, a defined voltage is present at the output.

If only the output A1 of the comparator V1 provides a signal in the form of a voltage lower than the defined voltage, this indicates that the digital signal at the input E of the circuit described has been identified as the first identification signal. If such a signal appears at the outputs A1 and A2 of both comparators V1 and V2, this indicates that the digital input signal has been identified as the second identification signal. These output signals are used as control signals to initiate various switching functions in an error-locating circuit (not shown).

FIG. 3 shows waveforms in time sequence at the input E; the input at the base of T4, across C4; at the collector of T5; at the inputs of V1 and V2; and at the outputs A1 and A2.

FIG. 3 depicts nonidentification waveforms appearing for the first eight time periods depicted. Thereafter, the first identification signal, comprising a series of nine successive zero bits, is depicted for the next nine time periods. It is noted that after the eighth successive bit a threshold signal TH1 is exceeded by the signal across C4, thus producing the pulse at the collector of T5. A pulse signal is thus presented at the input of V1 to produce the positive indication signal at A1. In the noted situation, the signal at A1 and the lack of the signal at A2 indicates that the first identification signal is present. Thereafter, five additional time periods of nonidentification signals are depicted. In the event that the second identification signal were presented at input E, the signal across C4 would continue to rise. The effect would be to widen the pulse at the collector of T5. The signal at V1 would also be widened. A signal at V2, higher in amplitude than V1 in response to the wider T5 pulse, would be present to trigger an output at A2, thus giving an indication with A1 that the second identification signal was present.

I claim:

1. Circuit arrangement for recognizing an identification signal in the form of a digital signal containing periodically recurring sections having a predetermined duration and a predetermined bit pattern in the form of a string of successive like bits, comprising;

a frequency discriminator, which responds to the periodicity of said periodically recurring sections, and from whose output voltage a control signal corresponding to a received identification signal is derived;

a time discriminator, coupled to the input of said frequency discriminator, which receives said digital signal at its input and provides a pulse to said frequency discriminator only if successive like bits were received for a period of time characteristic of sections of an identification signal, wherein said time discriminator gives the pulse a duration equal to the duration of the reception of successive like bits, and wherein said frequency discriminator output voltage has an amplitude which corresponds to the duration of said pulses and, thus, to the duration of the periodically recurring sections of the identification signal if the pulses applied to the frequency discriminator recur at the repetition rate characteristic of an identification signal; and a comparator which distinguishes different identification signals characterized by sections of different length by comparing the output voltage of the frequency discriminator with predetermined reference voltages.

2. A circuit arrangement as claimed in claim 1, characterized in that the time discriminator (1) contains a subcircuit (T2, T3, R5, C3, C4, R6 to R9) which generates a voltage proportional to one binary state of the input signal, and a threshold circuit (T4, T5, R10, R11, R12, C5) which derives from said voltage the pulses for the frequency discriminator (C6, S1), each of which begins when the voltage exceeds the threshold value, and ends when the voltage falls below the threshold value.

3. A circuit arrangement as claimed in claim 1, characterized in that the voltage-generating subcircuit includes a charging capacitor (C4) which is charged through a resistor (R6) as soon and as long as the input signal (E) is in said one binary state, and is discharged when said one binary state changes to the other, and that the charging voltage of the charging capacitor (4) is the input voltage of the threshold circuit (T4, T5, R10, R11, R12, C5).

4. A circuit arrangement as claimed in claim 3, characterized in that for identification signals whose sections are marked by at least nine successive like bits, the time constant for charging the charging capacitor (C4) and the threshold value of the threshold circuit are chosen so that the threshold is exceeded when eight successive like bits were received.

5. A circuit arrangement as claimed in claim 1, characterized in that the frequency discriminator (2) is a parallel resonant circuit (C6, S1) which is inductively coupled to the following comparator (3).

* * * * *